United States Patent [19]
Doeringer et al.

[11] Patent Number: 5,361,256
[45] Date of Patent: Nov. 1, 1994

[54] INTER-DOMAIN MULTICAST ROUTING

[75] Inventors: Willibald Doeringer, Langnau am Albis; Douglas Dykeman, Rueschlikon, both of Switzerland; Allan K. Edwards, Raleigh, N.C.; Diane P. Pozefsky, Chapel Hill, N.C.; Soumitra Sarkar; Roger D. Turner, both of Cary, N.C.

[73] Assignee: International Business Machines Corporation, Armonk, N.Y.

[21] Appl. No.: 68,351

[22] Filed: May 27, 1993

[30] Foreign Application Priority Data

Nov. 27, 1992 [EP] European Pat. Off. ........ 92810927.1

[51] Int. Cl.$^5$ .................... H04J 3/26; H04L 12/56
[52] U.S. Cl. .................... 370/60; 370/85.13; 370/94.1; 340/825.52
[58] Field of Search .............. 370/17, 60, 60.1, 62, 370/85.13, 85.14, 94.1, 94.2, 94.3; 340/825.02, 825.03, 825.04, 825.52; 379/202

[56] References Cited

U.S. PATENT DOCUMENTS

| | | | |
|---|---|---|---|
| 5,079,767 | 1/1992 | Perlman | 370/94.3 |
| 5,095,480 | 3/1992 | Fenner | 370/94.1 |
| 5,138,614 | 8/1992 | Baumgartner et al. | 370/62 |

FOREIGN PATENT DOCUMENTS 2631760  11/1989  France .

OTHER PUBLICATIONS

"Host Groups: A Multicast Extension for Datagram Internetworks", Ninth Data Communications Symposium, Sep. 1985, Whistler Mountain, British Columbia, Canada, pp. 172–179, by D. R. Cheriton et al.

"Multicast Support for Group Communications", Computer Networks and ISDN Systems, vol. 22, No. 3, Oct. 7, 1991, Amsterdam, Netherland, pp. 165–178, by L. H. Ngoh.

*Primary Examiner*—Melvin Marcelo
*Attorney, Agent, or Firm*—John J. Timar

[57] ABSTRACT

Disclosed are a method and a system for transmitting a message or data packet from a single sender (21) to a plurality, i.e. a group of receivers, usually called multicasting, within a conventional unicast transmission network, i.e. a network basically not equipped to handle such multicast transmissions, consisting of a plurality of subnetworks (22–24). The nodes or gateways (25–29) connecting the subnetworks maintain tables of multicast receiving stations (or groups of such) and the header of each message includes information defining the groups of the addressed multicast receiving stations.

16 Claims, 5 Drawing Sheets

INTER-DOMAIN MULTICAST ROUTING

DESCRIPTION

1. Field of the Invention

In computer networks, routing protocols are used to distribute information that allows determination of how to send a data packet or a message from any point in that network to its intended destination. In many cases, a data packet or message is sent from a single source, the sender, to a single receiver; this is usually called unicasting. Today's computer networks have elaborate routing protocols to support or assure safe, fast, and reliable execution of such unicast transmissions. If a data packet or message must, however, be sent from a single sending source to a group of receiving stations within a network - usually called multicasting - it is very inefficient, if at all possible, to rely on traditional unicast routing protocols for this purpose. For this, the present invention provides a solution; it relates to multicasting, in particular to a method of multicasting messages in a complex network that is originally equipped only for unicast transmission.

2. Background and Objects of the Invention

Existing state-of-the-ad routing protocols, such as the Inter-Domain Routing Protocol (IDRP), as disclosed e.g. in ISO "Information Processing Systems—Telecommunications and Information Exchange between Systems—Protocol for the Exchange Inter-Domain Routing Information Among Intermediate Systems to Support Forwarding of ISO 8473 PDUs", ISO/DIS CD 10747, 1991, being standardized by the International Standards Organization, ISO, provide a framework for routing unicast packets, that is, packets sent to a single destination.

Often, a key requirement of computer networks in general, and of applicant's Multi-Protocol Transport Network (abbreviated MPTN in the following) specifically, is to allow the multicasting of data packets, which are sent from a particular source to a group of destinations. Generally speaking, this invention gives a solution to this requirement by teaching a method of and a system for multicasting using a set of new protocols in combination with existing routing protocols (e.g. IDRP) to support multicasting in a computer network of arbitrary size and topology. It has characteristics which make it suitable for such an environment that are not found in any existing multicasting protocols.

In the following, background and objects of the invention shall be described in more detail. It should be understood, however, that the invention is not in any way restricted to use within the type of network described hereinbelow. Further examples can be found in other pads of the description.

Figure 1:
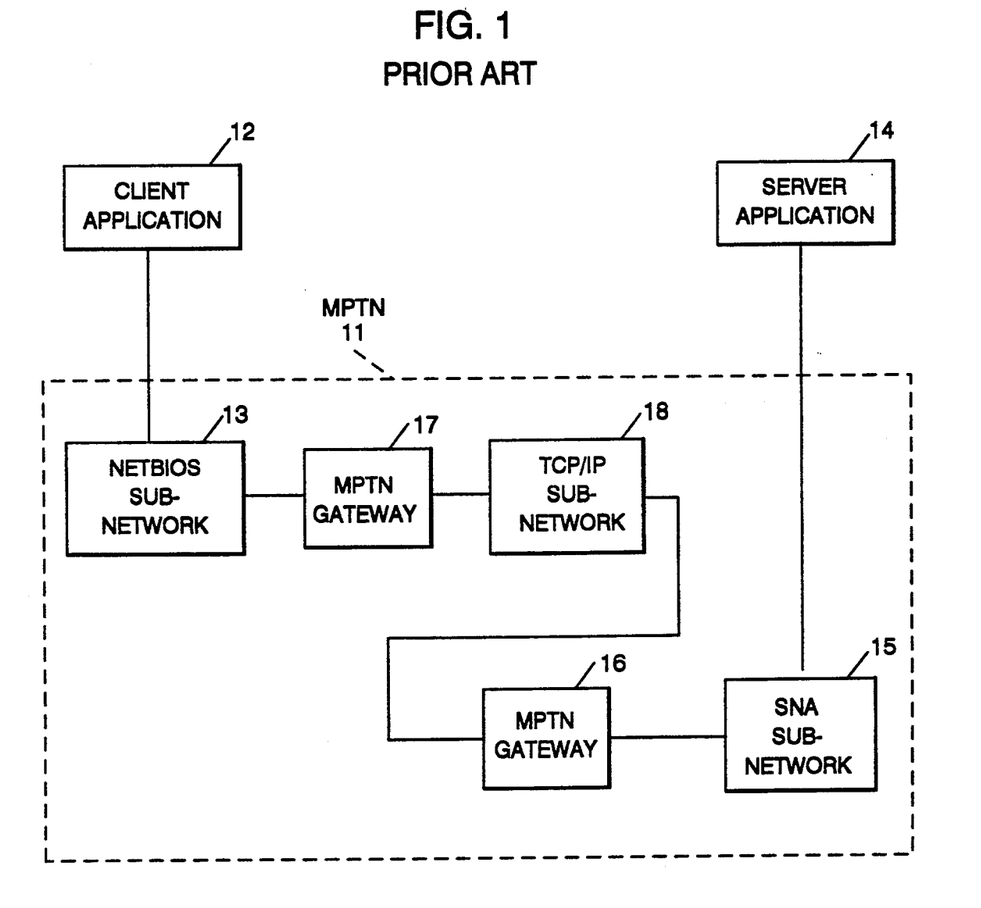
FIG. 1 illustrates a multi-protocol transport network (MPTN) comprised of three subnetworks (already discussed with the prior art above)

A widely used protocol set such as IBM's Multi-Protocol Transport Network provides connectivity-to computer applications, regardless of the network to which they are attached. Thus, as illustrated in FIG. 1, two applications attached to different subnetworks in the same MPTN 11 can communicate. As shown in FIG. 1, a client application 12 attached to a first subnetwork 13, e.g. a NetBIOS subnetwork (a trademark of the applicant), can communicate with a compatible server application 14 attached to a second subnetwork 15, e.g. a System Network Architecture (SNA, which is also a trademark of the applicant) subnetwork. MPTN gateways 16 and 17 are required to join the three different subnetworks 13, 15, and 18 into a single logical network (the MPTN); the gateways are connected via the third subnetwork 18, e.g. a Transmission Control Program/Internet Protocol (TCP/IP) network.

A key function of the MPTN gateways 16 and 17 is to route messages from their source (e.g., the client application 12) to the destination (e.g., the server application 14). This problem is difficult for the following reasons.

A path between the source and destination must be found that satisfies the requirements of the application (e.g., security, speed, reliability).

The MPTN may be very large, with many subnetworks and gateways. This can result in a very complex network topology, and therefore complex routing decisions need to be made at the gateways.

Due to link and node failures, or the installation of new equipment, the topology, and thus the correct routing decisions, change in real time.

To solve these problems, MPTN gateways make use of the routing protocol mentioned above that was standardized by the International Standards Organization, called the Inter-Domain Routing Protocol (IDRP). IDRP defines the formats and procedures of a protocol for routing from a single source to a single destination in a network of arbitrary topology and size. However, IDRP does not support multicasting, that is, delivery of a message from a single source to multiple destinations. On the other hand, multicasting is essential in MPTN for a number of reasons. First, some subnetworks support multicasting and, therefore, applications running on those subnetworks take advantage of this feature. In order to provide connectivity to such applications, multicasting must be supported in the internetworking environment. Second, some MPTN control protocols are based on multicasting. For example, protocols for locating a resource require that a search for that resource be distributed to all gateways attached to subnetworks in which it might be located.

Figure 2:
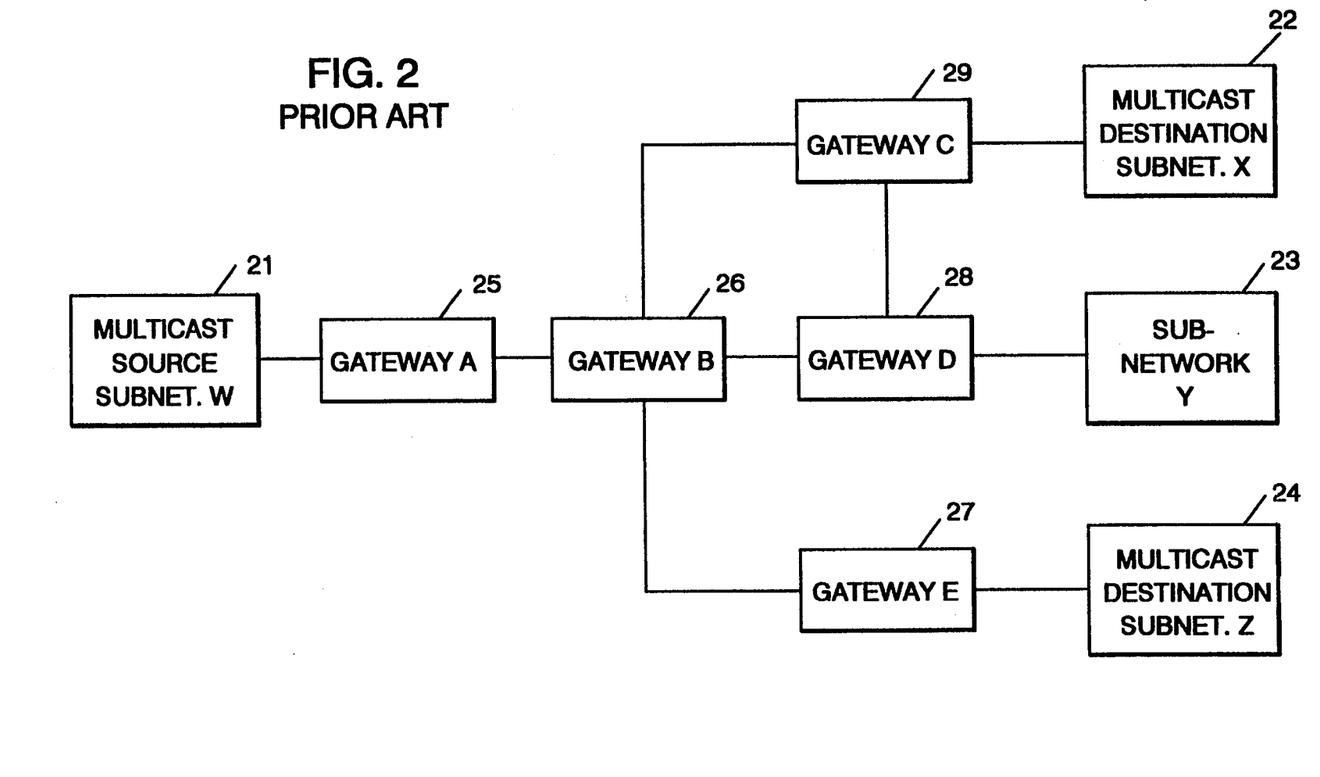
FIG. 2 illustrates an example for another MPTN (also already discussed above)

Some examples of the problems associated with multicasting in an internetwork environment are now described making reference to the simple MPTN illustrated in FIG. 2. In this example, a multicast is initiated by an application in subnetwork W (21) that should be delivered to destinations in subnetworks X (22) and Z (24). There are no destinations in subnetwork Y (23). The problems associated with such an operation include:

It is not acceptable to generate separate (unicast) messages to all destinations since this would create an unnecessary load on the MPTN resources. For example, in FIG. 2, such a unicast strategy would necessitate that one message for each destination be sent on the link between gateway A (25) and gateway B (26) instead of just a single multicast message.

It is not acceptable to multicast the message to every subnetwork in the MPTN. In the example, subnetwork Y (23) should not receive a multicast destined only to nodes in subnetworks X (22) and Z (24). Although not illustrated by the example, it is clear that in a large MPTN with many subnetworks and many different multicast groups, such a flooding strategy would not be acceptable.

A given packet should only be multicast once to a given subnetwork. In the example network, there are two paths from gateway B (26) to subnetwork X (22), via gateway D (28) and via gateway C (29) direct. Subnetwork X (22) should, however, only receive a single copy of the multicast from the source in subnetwork W (21). This rule must hold regardless of the number of gateways attached to subnetwork X (22), or the number of paths between a source and a particular destination subnetwork. This is important to minimize the load placed on subnetworks due to multicast traffic, and to avoid duplication of packet delivery which may necessitate error recovery. protocols for some applications.

Prior Art

For a better understanding of the invention, solutions for multicasting messages in other environments, and existing solutions in internetworking environments will be reviewed.

Local Area Networks (LANs)

LANs are a very special type of subnetworks since they naturally support a broadcast function, such that a single message is easily delivered to all nodes. The most common LAN multicast strategy is therefore to broadcast messages, and let each attached computer filter those messages not required by local users. An example is given by S.E. Deering and D.R. Cheriton in "Multicast Routing in Datagram Internetworks and Extended LANs", ACM Transactions on Computer Systems, Vol. 8, No. 2, pp. 85–110, ACM, May 1990. However, such a strategy seems unsuitable for a large internetwork, as previously explained. It should also be mentioned that essentially the same observations hold for Metropolitan Area Networks (MANs).

When LAN segments are interconnected by bridges, these can selectively filter LAN messages so that they are only broadcast on segments where at least one node is a destination for a multicast. These protocols work as follows (see Deering and Cheriton, cited above, for variations on this basic algorithm):

1. Group members broadcast their existence on the LAN to which they are attached. These broadcasts are forwarded by bridges onto all LAN segments so that all bridges can learn tile location of group members.

2. When a multicast packet for a group is received, only bridges on the path to one or more members of that group forward the packet. Thus, flooding of all LAN segments for each multicast is avoided.

A restriction of such LAN-based multicasting is that no loops are allowed in the topology, i.e. there cannot be multiple paths via bridges between any two LAN stations. This is required since otherwise the simple forwarding scheme used by the LAN bridges would result in packets being broadcast forever around any such loop. Such a scheme is unsuitable for multicasting in a large internetwork since all traffic would be forced to take the same path through the internetwork thereby creating an unacceptable load on the involved links. Algorithms exists which allow loops to exist in the LAN topology, but a single set of bridges is selected that form a loop-free spanning tree for forwarding multicasts. Thus, all multicast traffic is still forced to follow a single path along the branches of the spanning tree.

Multicasting in the Internet

Multicasting algorithms exist that work with routing protocols used in Internet Protocol (IP) networks. IP networks provide routing and relaying of packets (called datagrams) over a general topology network consisting of LANs, point-to-point links, and even subnetworks such as X.25. An IP internetwork consists of a collection of such subnetworks interconnected by IP routers.

The following routing protocols used in IP networks are all based on a distance-vector (sometimes also called path-vector) routing scheme like that used in IDRP:

Routing Information Protocol (RIP), as described by C.L. Hedrik in "Routing Information Protocol", RFC 1058 (Request for Comments), NIC (Network Information Center), June 1988.

Hello Routing Protocol, disclosed by D.L. Mills in "Experimental Multiple Path Routing Algorithm", RFC 981, NIC, March 1986.

Border Gateway Protocol (BGP), described by K. Lougheed and Y. Rekhter in "Border Gateway Protocol (BGP)", RFC 1163, NIC, June 1990.

Gateway-Gateway Protocol (GGP), as disclosed by R.M. Hinden and A. Sheltzer in "DARPA Internet Gateway", RFC 823, NIC, September 1982, As will be apparent later, the present invention provides a solution directly applicable to all networks based on the above (and equivalent) routing protocols, IP multicast algorithms have been developed primarily for use with the Routing Information Protocol as disclosed by C.L. Hedrik, cited above, but are usable with the other distance-vector routing algorithms as well. IP multicast algorithms (see, e.g. S.E. Deering and D.R. Cheriton, cited above; S.E. Deering: "Host Extensions for IP Multicasting", RFC 1112, NIC, August 1988; L. Hughes and P. Thomlinson: "A Multicast Internetwork Routing Algorithm". Proceedings of the IFIP WG 6.4 Conference on High Speed Networking, 18–22 March 1991, Berlin, pp. 183–200; D. Waltzman, C, Partridge, and S.E. Deering: "Distance Vector Multicast Protocol", RFC 1075, NIC, November 1988) are all variants of the Reverse Path Broadcasting algorithm described by Y.K. Dalai and R.M. Metcalfe in "Reverse Path Forwarding of Broadcast Packets", Communications of the ACM, Vol. 21, No. 12, pp. 1040–1048, ACM, December 1978. This algorithm is similar to the LAN multicast algorithm in that a spanning tree is used to distribute the multicast packets, however it contains additional features to solve some of the problems associated with LAN multicasting. In brief, the algorithm works as follows (see S.E. Deering and D.R. Cheriton, cited above, for a more detailed description):

1. Multicast packets are initially broadcast to all subnetworks in the internetwork. Packets are broadcast on a least-cost spanning tree. When a router receives a multicast packet from some source "S", it knows that it is on the spanning tree for multicasts originating from S if its routing tables indicate that it can reach node S with a lower cost than all other routers attached to a given subnetwork (this information is available in the normal IP routing tables). If so, that router forwards the multicast packets on the subnetwork in question. It was shown by S.E. Deering and D.R. Cheriton, cited above, that this algorithm results in the multicast packet being distributed to each subnetwork in the internetwork with minimum cost.

An obvious improvement of this scheme compared to the LAN multicasting schemes is that while here the multicast spanning tree is fixed for a given source, it is not the same for all sources. Thus multicast traffic is distributed over many different paths in the network.

2. In order to avoid broadcasting multicast packets to subnetworks that do not have members in the specified group, a scheme is used whereby routers that receive a multicast for a particular group that do not lie on a branch of the multicast tree that leads to any members of that group discard the multicast (there is obviously no need to forward it) and report to the predecessor in the multicast tree that this branch of the tree may be pruned. This process begins with routers attached to "leaf subnetworks" (subnetworks that are at the end of their respective branches owl the tree), and works its way up the branch as far as possible to restrict the distribution of multicast traffic to where it is required.

The IP multicast schemes have the following drawbacks:

Initially, multicasts from a given source to a given group must be broadcast to the entire internet until the multicast tree for that source-destination pair is pruned.

The scheme requires that information used for pruning the multicast trees be discarded after some time so that new members that loin the network on a previously pruned tree branch will eventually start receiving the multicasts. Thus, multicasts trees are continuously re-built and repruned, creating considerable overhead on the network links and processing nodes.

Multicast trees exist for each source-multicast group pair. That is, a separate logical multicast tree exists for each different source that multicasts to a given group. Titus routing nodes may have to maintain an extremely large database for pruned multicast trees.

For these reasons such protocols or algorithms seem unsuitable for use in the MPTN and similar architectures. A useful algorithm should be able to utilize the routing capabilities of gateways which have no multicast intelligence.

In some more detail, the following goals or objects of the invention can be identified as requirements for providing multicast service:

1. Multicast packets must not be broadcast to all subnetworks, and in fact should be restricted to being sent only to subnetworks that have a multicast group member.

2. Each multicast packet must be delivered exactly once to each destination subnetwork (i.e. duplicate multicast packets must not be created).

3. The protocols should not require any centralized elements. They should be completely distributed.

4. The protocols should not require computation of a spanning tree from a centralized database.

5. Routing decisions for multicast packets must be flexible. Distribution of all multicasts over a fixed spanning tree for example is not acceptable.

6. The number of packets distributed must be minimized. In particular, it is not acceptable to generate a separate unicast packet for each destination.

7. The cost of distributing the multicast packets must be minimized. Thus, a good path must be taken from the multicast source to each destination.

SUMMARY OF THE INVENTION

In brief, the present invention achieves the above objects by a method and a system for multicasting a message from a sending station to a plurality of receiving stations within a conventional unicast message transmission network using existing protocols by, at least in certain nodes within the network, maintaining tables of subnetworks with multicast receiving stations or tables of multicast receiving stations and by including appropriate routing information in the header of multicast messages, as further defined in the claims.

With this invention, a solution is presented that, when used in combination with distance-vector routing protocols such as the standard OSI IDRP routing protocol, disclosed in ISO "Information Technology—Telecommunications and Information Exchange between Systems—Intermediate System to Intermediate System Intra-Domain Routing Protocol for Use in Conjunction with the Protocol for Providing the Connection", ISO/DIS 10589, 1990, or any other similar protocol, such as those used in IP networks referenced above, supports multicasting in large internetworks. This solution is also usable with link-state routing protocols, such as OSPF developed for IP networks (described by J. Moy in "OSPF Version 2", RFC 1247, NIC, July 1991) and the OSI IS-IS protocol (described in ISO/DIS 10589, cited above) and are thus applicable to a wide range of internetworking environments. Within the invention, three new types of protocols are presented:

1. for the distribution of routing information based on network topology and the location of multicast group members, and for the creation of routing tables using this information;

2. for efficiently forwarding multicast packets to all members of a multicast group given the routing information front tile first step; and 3. for enabling the multicast protocols to be used in the MPTN environment.

Details and examples of the invention will be described in the following in connection with the drawings.

THE DRAWINGS

FIGS. 2 and 3 show essentially the same arrangement, the reference numbers are chosen such that the last digit of each number identifies the same part in each figure, i.e. "21" in FIG. 2 is the same part as "31" in FIG. 3.

DETAILED DESCRIPTION

The following section is divided into four pads. The first pad, entitled "Routing Information", describes the routing information that is distributed and the tables that are created for routing multicast packets. The second pad, entitled "Multicast Packet Forwarding", describes the procedures for using the created tables to route multicast packets. Then, in the third pad, entitled "Multicast with Reduced Routing information:", a description is given of how the amount of routing information required for the multicasting protocols can be reduced. Finally, in part four, entitled "MPTN Use of Multicast", an example is given of how MPTN uses the protocols described in this invention.

Routing Information

A brief description of the Inter-Domain Routing Protocol (IDRP) protocol is provided so that the invention may be better understood. Further details can be found in ISO/DIS 10589, referred to above.

IDRP distributes routing information between gateways in so-called Update PDUs, i.e. Update Protocol Data Units. Update PDUs contain the following fields that are relevant to the invention.

1. Reachability Information: this field specifies the resources that can be reached along the path specified in this Update PDU. It can be the address of a specific end system, or it can be the prefix common to the addresses used by a set of end systems. All systems whose address contains a given prefix reside in the same subnetwork, and therefore this prefix uniquely identifies this subnetwork. A type field is defined in the reachability information which indicates that the reachability information is an address prefix (type=O). Thus, different types of reachability information could be distributed in Update PDUs by defining a new type code.

2. Quality of service: this specifies properties like cost, delay, and security implications of using the routing information in this update PDU.

3. Path: the routing information that specifies how to reach the end systems identified by the prefix(es) in the reachability information.

Based on received Update PDUs, gateways build routing tables, called Forwarding Information Bases (FIBs) in IDRP. For each destination (a destination is identified by a prefix received in an Update PDU, and may thus be a single node or a set of nodes), the next gateway on the path to that destination is stored (this is determined from the path field in the update PDU). Exactly one path for each prefix is stored for each unique set of quality of service parameters. This path is the one that can best provide the specified quality of service.

In the invention, a new type of reachability information is defined, called a group identifier (groupid). A groupid is used to address a group of end systems that are to receive a particular set of multicasts. The groupid, which is chosen from the normal subnetwork address space, is therefore included as the destination address of a multicast packet so that the proper group of end systems is identified. The end systems addressed by a particular groupid are not necessarily located in a common subnetwork. Selecting groupids from the standard address space guarantees that they represent valid reachability information even for gateways which do not implement the multicast extensions described below.

To support unicast inter-domain routing, subnetworks report the address prefix(es) shared by its nodes to gateways. These prefixes are used to create the Update PDUs as described above. In the invention, subnetworks also report all groupids reachable in that subnetwork.

Figure 3:
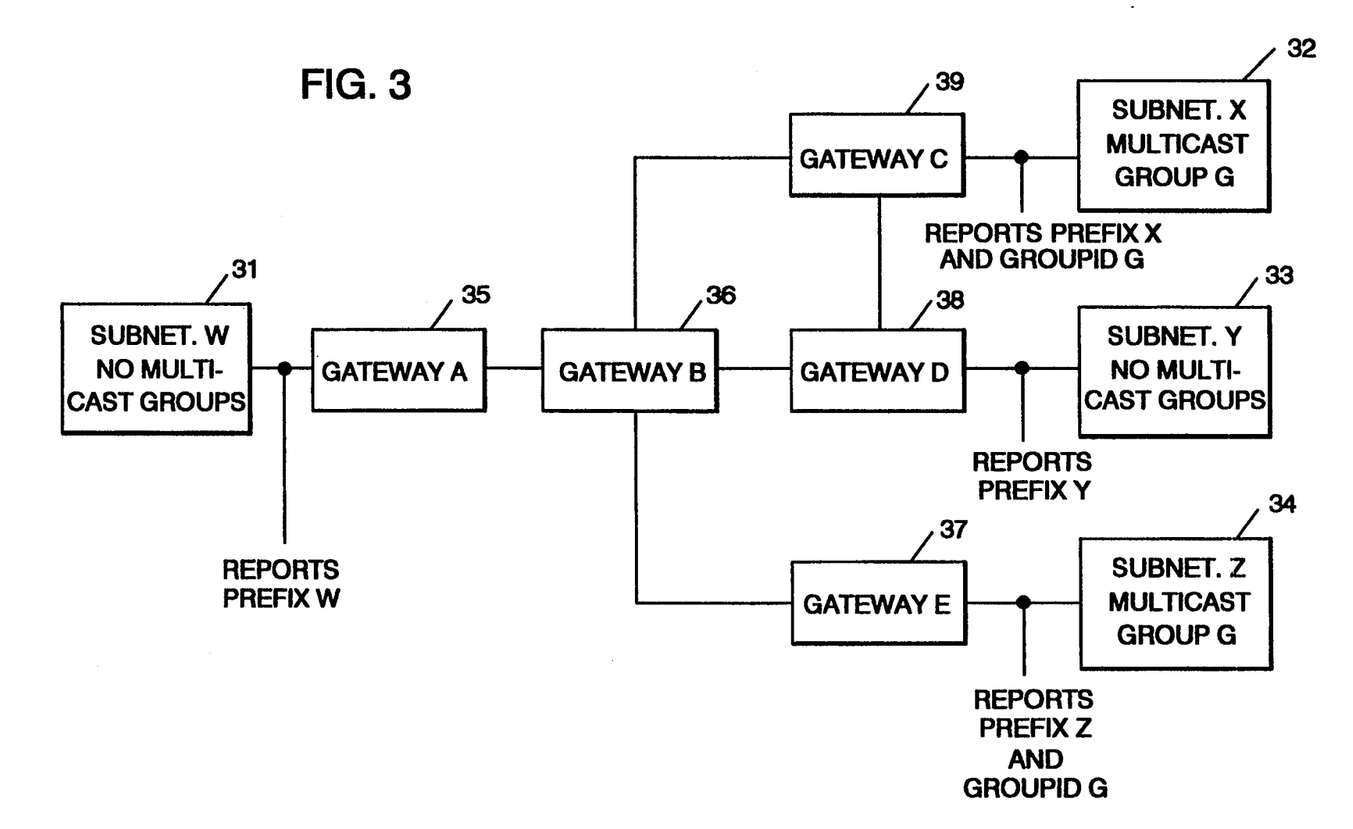
FIG. 3 illustrates an example of the information learned by gateways from attached subnetworks.

An example is illustrated in FIG. 3. In that figure, the subnetworks with prefixes X (32) and Z (34) also have end systems in group (9. They therefore report both the prefix and the groupid to the local gateways C (39) and E (37). Subnetworks W (31) and Y (33) do not have any groupids to report, so they report only their prefixes. Note that a given subnetwork may report multiple groupids and prefixes (not illustrated).

IDRP Update PDUs are constructed as follows. Update PDUs not containing groupids are constructed as specified in ISO/DIS CD 10747, mentioned above. Update PDUs used to advertise reachability to groupids must contain the following information:

An address prefix of the subnetwork, and
one or more groupids for that subnetwork.

The reachability information in an Update PDU containing groupids consists of only the groupids and (one of) the address prefix(es) unique to the end systems in the subnetwork reporting the groupids, so that all gateways will be able to build an association between the subnetwork prefix and the groupids reachable in that subnetwork.

The Update PDU constructed in this manner is delivered with the reachability information field unchanged to all gateways according to the existing IDRP protocols. Note that this Update PDU construction is allowed by the IDRP standard, and that no other changes to the Update PDU construction or distribution are required.

In the example shown in FIG. 3, gateway C (39) would create an Update PDU with the following reachability information: prefix =X, groupid =G. Similarly, gateway E (37) would create an Update PDU with prefix =Z and groupid=G. Both of these Update PDUs would be distributed to all other gateways according to the IDRP protocol to allow all of them to learn the association between group G and subnetworks X and Z.

As reachability information changes (e.g., the prefix changes, or groupids are added or deleted), the changes are reported to the local gateways which use the normal IDRP routing protocols to update all MPTN gateways with the new information.

Construction of Update PDUs as specified above allows gateways to build an additional routing table which will be referred to as the Multicast Routing Table or MURT. The MURT contains for each groupid the list of prefixes for subnetworks containing members of that group, as learned from Update PDUs containing groupids. How the MURT is used for routing is explained in the next section.

In the system of FIG. 3, following the distribution of the Update PDUs as described above, each gateway would have a MURT entry for groupid G, identifying X and Z as the prefixes of subnetworks in which group members are located.

The remaining IDRP routing tables (e.g., the FIB as described above) are constructed according to existing IDRP specifications. In particular the path information associated with all reachability information (including groupids) is stored in the FIB.

Thus far in this section, the procedure for constructing a MURT using the OSI IDRP routing protocol has been described. This same procedure can be used with any distance-vector routing protocol, as e.g. described in the following references: C.L Hadrick, "Routing Information Protocol", RFC 1058, NIC, June 1988; R.M. Hinden and A Sheltzer, cited above; K. Loughead and Y. Rekhter, cited above; D.L. Mills, cited above. In all such protocols, Update PDUs are distributed to advertise reachability to a given address or address prefix. By associating groupids with each address prefix, a MURT can be constructed as described above.

A MURT can also be constructed using link-state routing protocols such as those described in ISO/DiS 10589, 1990 or in J. Moy, cited above. In those protocols, each gateway distributes reachability information in link-state PDUs, which provide information on the state of each link adjacent to that gateway, as well as all address prefixes directly reachable from that gateway. These link state PDUs are forwarded unmodified to all other gateways in the system. Therefore, by also including a list of groupids in the link state PDUs, a MURT can be constructed associating the group with a list of address prefixes of subnetworks in which group members reside. Both distance-vector and link-state routing protocols create an FIB which is essentially equivalent to that created by IDRP. Due to this, the multicast forwarding algorithm described in the next section is also applicable to these environments.

Multicast Packet Forwarding

Conceptually, once the MURT is constructed as described in the previous section, routing of multicast packets is very simple. The MURT allows the subnetworks in which members of the multicast group are located to be identified. Furthermore, the IDRP FIB can be used to route packets to each of these subnetworks. A copy of each multicast packet could simply be routed to each of these subnetworks. However, due to the MPTN requirements specified in the section entitled Summary of the Invention, above, regarding restrictions on the number of distributed packets, the methods and algorithms specified in this section are an essential part of this invention.

The invention also defines a Multicast Spanning-Tree Algorithm (MSTA) for routing multicast packets in an MPTN. The MSTA is also usable in other networks that provide routing information similar to that specified in the previous section.

To assist the reader in understanding, MSTA is presented in an example before the detailed algorithms are given.

The topology of the network used in this example is illustrated in FIG. 3. Using the protocols of the previous section, the following routing tables are constructed at the respective MPTN gateways:

At gateway A (35)
    FIB (prefix: next hop on shortest path)
        address prefix W:    addresses with this prefix are located in the local subnet (31)
        X:    the next gateway on the path to the subnet containing addresses with this prefix is Gateway B.
        Y:    gateway B
        Z:    gateway B
        G:    gateway B
    MURT (groupid: associated prefixes)
        groupid G:    the prefixes associated with this groupid are X,Z
At gateway B (36)
    FIB (prefix: next hop on shortest path)
        W:    the next gateway on the path to the subnet containing addresses with this prefix is Gateway A.
        X:    gateway C
        Y:    gateway D
        Z:    gateway E
        G:    gateway E
    MURT (groupid: associated prefixes)
        groupid G:    the prefixes associated with this groupid are X,Z
At gateway C (39)
    FIB (prefix: next hop on shortest path)
        address prefix X:    addresses with this prefix are located in the local subnet (32)
        W:    the next gateway on the path to the subnet containing addresses with this prefix is Gateway B.
        Y:    gateway D
        Z:    gateway B
        G:    local subnet (32)
    MURT (groupid: associated prefixes)
        groupid G:    the prefixes associated with this groupid are X,Z
At gateway D (38)
    FIB (prefix: next hop on shortest path)
        address prefix Y:    addresses with this prefix are located in the local subnet (33)
        W:    the next gateway on the path to the subnet containing addresses with this prefix is Gateway B.
        X:    gateway C
        Z:    gateway B
        G:    gateway C
    MURT (groupid: associated prefixes)
        groupid G:    the prefixes associated with this groupid are X,Z
At gateway E (38)
    FIB (prefix: next hop on shortest path)
        address prefix Z:    addresses with this prefix are located in the local subnet (34)
        W:    the next gateway on the path to the subnet containing addresses with this prefix is Gateway B.
        X:    gateway B
        Y:    gateway B
        G:    local subnet (34)
    MURT (groupid: associated prefixes)
        groupid G:    the prefixes associated with this groupid are X,Z The basic layout is shown in FIG. 3. In this example, G is the groupid of a multicast group which has members in subnetworks X (32) and Z (34). A source node in subnetwork W (31) sends a multicast to groupid G.

MPTN gateway A (35) receives the multicast packet addressed to groupid G from subnetwork W (31). Its MURT entry indicates that the multicast is to be sent to the subnetworks with prefixes X (32) and Z (34). From its FIB, gateway A (35) determines that the next hop for both X and Z is gateway B (36). It therefore sends an MPTN multicast packet to gateway B (36) with the following fields:

destination =G
    target subnetworks =X, Z
    data as specified in the original multicast packet Note that the target subnetworks field specifies all unique destination subnetworks for this multicast on a given path. Since both subnetworks X (32) and Z (34) are reached through gateway B (36), only a single packet is sent from gateway A (35) to gateway B (36) to accomplish the multicast.

Gateway B (36) receives the multicast packet specified above. Since the target subnetworks are specified, it does not need to make use of the MURT. Note that this implies that only gateways that are attached to possible sources of multicast traffic need to maintain a MURT. All other gateways do not need to create this table. Gateway B uses its FIB to determine that the next hop for subnetwork X is gateway C (39) and for subnetwork Z (34) gateway E (37). It therefore sends an MPTN multicast packet to gateway C with the following fields:

destination =G
    target subnetworks =X
    data as specified in the original multicast packet Note that the target subnetworks field only includes those subnetworks on this path. Subnetwork Z (34) is reached via a different path and is therefore not included in the multicast to gateway C (39).

Similarly, gateway B (36) sends an MPTN multicast packet to gateway E (37) with the following fields:

destination =G
    target subnetworks =Z
    data as specified in the original multicast packet Gateway C (39) receives the multicast destined for subnetwork X (32) to which it is attached. It therefore multicasts the packet to groupid G in subnetwork X, Similarly, gateway E (37) multicasts the packet in subnetwork Z (34) to all members of groupid G. Thus the multicast is delivered to all members of groupid G. The algorithms above meet all MPTN requirements for efficient multicast:

1. The packet was only multicast in subnetworks that have a multicast group member (e.g., X and Z, but not Y). The MURT identifies the destination subnetworks.

2. Each multicast packet was delivered exactly once to each subnetwork. The target subnetworks field of the MPTN multicast is used to ensure that each subnetwork receives exactly one copy of the multicast.

3. There are no centralized elements. The creation of the MURT, and the routing of multicast packets is completely distributed.

4. The algorithms do not require computation of a spanning tree from a topology database.

5. The multicast routing has all the flexibility of normal MPTN routing. As shown in the example, the normal IDRP FIBs are used to route multicast packets. This implies that different routes may be used for different multicast packets due to different quality of service requirements and/or changing network conditions (topology or load).

6. The number of packets distributed is minimized. A multicast packet to several destinations (e.g., X and Z) is only sent as separate packets when the best routes to the different destinations are not the same. In the example, only a single packet was sent from gateway A to gateway B, but gateway B sent individual packets to gateways C and E.

7. The multicast packets are sent on the best route to each destination according to the IDRP FIB. A unicast packet to one of the given destinations would follow the same path as the multicast packet to that destination.

It is also important that only a single MURT entry is created per multicast group. The multicast algorithms for the Internet Protocol described in the Prior Art section of this disclosure require nodes to create multicast tables with entries for each source-group pair (thus the number of entries is multiplied by the total number of sources compared to the MPTN scheme).

Having given the above informal description of the MPTN multicast packet forwarding algorithm, the procedures for multicasting are now specified in detail. One procedure is specified for the MPTN gateway that initially receives the multicast packet from a subnetwork (List A), and one for intermediate MPTN gateways that forward multicasts received from other gateways (List B).

List A—Procedure: Initiate_MPTN_Multicast

This procedure is used by an MPTN gateway that receives a multicast packet from a subnetwork.

Input: The subnetwork multicast packet which specifies a destination groupid, quality of service, and the data to be multicast.

Output: MPTN multicast packets to the next gateways on the path to the target, or a multicast directly to target subnetworks that are directly attached to the gateway.

Using the specified groupid as a key into the MURT obtain the list of prefixes for subnetworks containing members of the group.

For each prefix in the list

Use the prefix and the specified quality of service as a key into the IDRP FIB to determine the next hop gateway on the path to that subnetwork.

Add this prefix to a list for the particular next hop.

For each next hop list created above

Set target_subnetworks to the list of prefixes associated with that next hop.

Send the MPTN multicast including the groupid, target_subnetworks, quality of service, and data to that next hop.

Note that in some cases the target subnetwork is directly attached to this gateway and that the multicast is forwarded directly to that subnetwork in those cases.

List B—Procedure: Forward_MPTN_Multicast

This procedure is used by an MPTN gateway to forward a multicast packet received from another MPTN gateway.

Input: The MPTN multicast including the groupid, target_subnetworks, quality of service, and data as created in procedure Initiate_MPTN_Multicast.

Output: MPTN multicast packets to the next gateways on the path to the target, or a multicast directly to target subnetworks that are directly attached to the gateway.

For each prefix in the received target_subnetworks list

Use the prefix and the specified quality of service as a key into the IDRP FIB to determine the next hop gateway on the path to that subnetwork.

Add this prefix to a list for the particular next hop.

For each next hop list created above

Set target_subnetworks to the list of prefixes associated with that next hop.

Send the MPTN multicast including the groupid, target_subnetworks, quality of service, and data to that next hop.

Note that in some cases the target subnetwork is directly attached to this gateway and that the multicast is forwarded directly to that subnetwork in those cases.

Multicast with Reduced Routing Information

In the multicasting scheme described in the previous sections, a MURT entry for a group is required at every gateway that is attached to a potential source of multicast traffic to that group. In large MPTNs with many groups, this may be undesirable. Therefore in this section, an alternative scheme is described in which MURT entries for a particular multicast group need only be maintained at gateways attached to subnetworks with members in that group (other gateways may optionally maintain these MURT entries). This scheme can potentially reduce the amount of storage required to support multicasting at the expense of optimal routing, as will be shown. The scheme described in this section is an integral part of this invention, and can be used in combination with, or in place of the previous scheme.

With this scheme, subnetworks report groupids and address prefixes to adjacent gateways as was described in the section entitled Routing Information. These gateways must create MURT entries for the specified groupids. They must also create IDRP update PDUs as described in the addressed section. However, gateways not attached to a subnetwork containing members of a particular groupid are not forced to maintain MURT entries for that groupid.

Forwarding of packets addressed to a groupid is done as follows:

If a packet to be forwarded has the target subnetworks field set by a previous MPTN gateway, it is forwarded according to the algorithm in List B. This can be done by all gateways since a MURT is not required for this algorithm (the destination prefixes are specified in the target subnetworks field).

If a packet to be forwarded does not have the target subnetworks field set, and the destination address is a groupid for which a MURT entry is maintained at this gateway, the procedure for initiating an MPTN multicast in List A is followed.

If a packet to be forwarded does not have the target subnetworks field set, and no MURT entry exists for the destination address, the packet is forwarded point-to-point based on the IDRP FIB entry for that address.

If only the gateways attached to the subnetworks with members of a group have a MURT entry for that groupid, the packet will be routed point-to-point to one of those gateways, which will then cause it to be multicast to the remainder of the gateways.

The above algorithm for routing with reduced information is illustrated with an example, again referring to the network depicted in FIG. 3. Using the protocols specified in this section, the following routing tables are constructed at the respective MPTN gateways:

```
At gateway A (35)
    FIB (prefix: next hop on shortest path)
        address prefix W:  addresses with this prefix are located
                           in the local subnet (31)
                    X:     the next gateway on the path to the subnet containing
                           addresses with this prefix is Gateway B.
                    Y:     gateway B
                    Z:     gateway B
                    G:     gateway B
At gateway B (36)
    FIB (prefix: next hop on shortest path)
                    W:     the next gateway on the path to the subnet
                           containing addresses with this prefix is Gateway
                           A.
                    X:     gateway C
                    Y:     gateway D
                    Z:     gateway E
                    G:     gateway E
At gateway C (39)
    FIB (prefix: next hop on shortest path)
        address prefix X:  addresses with this prefix are located
                           in the local subnet (32)
                    W:     the next gateway on the path to the subnet containing
                           addresses with this prefix is Gateway B.
                    Y:     gateway D
                    Z:     gateway B
                    G:     local subnet (32)
    MURT (groupid: associated prefixes)
        groupid G:  the prefixes associated with this groupid are
                    X,Z
At gateway D (38)
    FIB (prefix: next hop on shortest path)
        address prefix Y:  addresses with this prefix are located
                           in the local subnet (33)
                    W:     the next gateway on the path to the subnet containing
                           addresses with this prefix is Gateway B.
                    X:     gateway C
                    Z:     gateway B
                    G:     gateway C
At gateway E (37)
    FIB (prefix: next hop on shortest path)
        address prefix Z:  addresses with this prefix are located
                           in the local subnet (34)
                    W:     the next gateway on the path to the subnet containing
                           addresses with this prefix is Gateway B.
                    X:     gateway B
                    Y:     gateway B
                    G:     local subnet (34)
    MURT (groupid: associated prefixes)
        groupid G:  the prefixes associated with this groupid are
                    X,Z
```

In this example, "G" is the groupid of a multicast group which has members in subnetworks X (32) and Z (34), and it is assumed that only gateways C (39) and E (37) maintain MURT entries for groupid G. Hence, all other gateways treat G like a unicast address (i.e., according to the existing IDRP procedures), and therefore maintain a single entry for G in their FIBs. The fact that multiple gateways advertise a path to G (gateways C and E in the example) is not a problem, since IDRP allows for this. However, gateways only store routing information (in the FIB) for the best path for a given prefix. For example, gateway B (36) has a FIB entry of gateway E (37) associated with G rather than gateway C (39). This could have been reversed, but in any event only one of the paths is stored in the FIB.

MPTN gateway A (35) receives a multicast packet addressed to G from subnetwork W (31). it does not have a MURT entry for G, so it routes the packet based on the FIB entry for G (to gateway B) with the following fields:
    destination = G
    target subnetworks = not set
    data as specified in the original multicast packet
Note that the target subnetworks field is not set since the MURT entry for G is not available.

Gateway B (36) receives the packet, and since it also does not have a MURT entry for G, routes the packet based on its FIB to gateway E (37) with the following fields:
    destination = G
    target subnetworks = not set
    data as specified in the original multicast packet
Gateway E (37) is attached to subnetwork Z which has members in group G, and therefore it has a MURT entry for G. The MURT indicates that the packet is to be multicast in subnetworks with prefixes X and Z. Since subnetwork Z (34) is attached, it multicasts the packet into that subnetwork. Since the FIB entry for subnetwork X (32) is gateway B (36), an MPTN multicast packet is sent to gateway B with the following fields:
    destination = G
    target subnetworks = X
    data as specified in the original multicast packet
Since the target subnetworks fields is now set, gateway B (36) forwards the packet based on that field (contrast the routing decision made here to that made at gateway B above). Thus, since the FIB entry for subnetwork X (32) is gateway C (39), it forwards the MPTN multicast packet to gateway C with the following fields:
    destination = G
    target subnetworks = X
    data as specified in the original multicast packet
Finally, gateway C (39) multicasts the packet to groupid G in subnetwork X (32) to which it is attached.

Note that in this example the packet was routed through gateway B (36) twice; once with the target subnetworks field not set, and once with it set. Thus, the savings in storage for not maintaining the MURT entries at gateways A, B, and D (35, 36, and 38) come at the expense of suboptimal routing behavior for multicast packets.

MPTN Use of Multicast

As noted previously, MPTN relies on multicasting to support multicasts by applications using MPTN, and to support MPTN control algorithms. These problems and the manner in which they are solved are described in this section.

Figure 4:
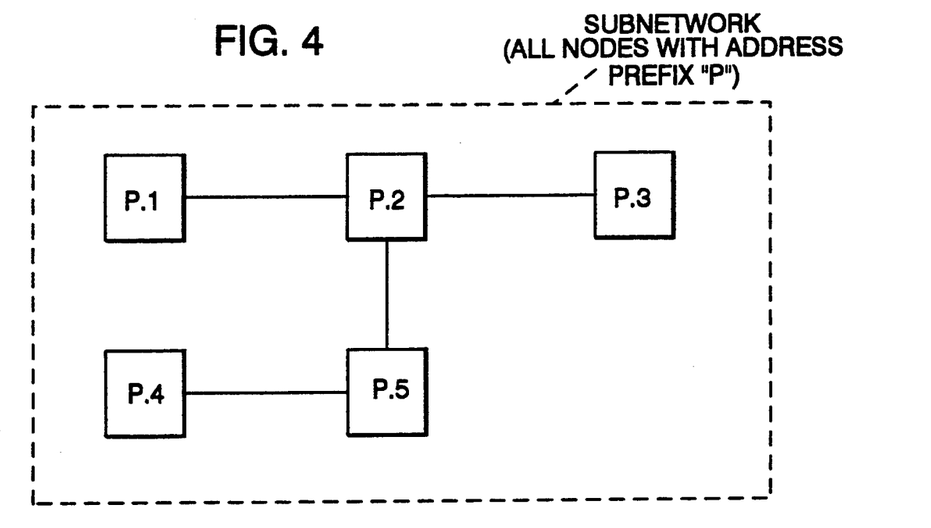
FIG. 4 illustrates a detail in a subnetwork, namely all nodes with a common address prefix in such a subnetwork.

Existing routing protocols require that all nodes whose addresses have a common prefix be located in a single subnetwork. In that way, the prefix uniquely identifies the subnetwork, and operations involving nodes with the given prefix can be entirely performed within that subnetwork. This is illustrated in FIG. 4.

Figure 5:
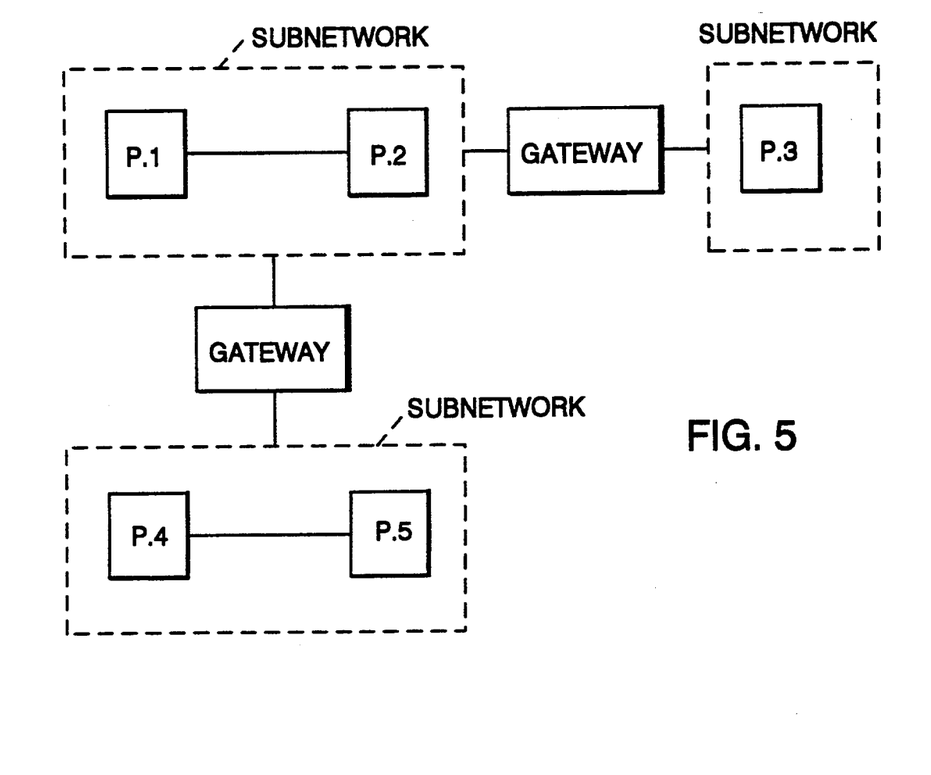
FIG. 5 illustrates various nodes with a given address prefix in different subnetworks.

MPTN allows nodes in different subnetwork to have the same address prefix. Thus, such a prefix does not uniquely identify a particular subnetwork, and operations involving nodes with this prefix may have to be distributed over multiple subnetworks. This is illustrated in FIG. 5. This is referred to as a "split netid", since "netid" is a synonym for address prefix, and "split" implies that the nodes with the given netid are split up among different subnetworks. The subnetworks containing nodes in the split netid are called "islands" of that split netid. Thus, FIG. 5 illustrates a split netid with 3 islands. Support of such split netids has implications on the following MPTN operations:

1. Packets multicast by MPTN users to nodes in a split netid must be delivered to all subnetworks containing such nodes.

2. In order to route connections and unicast datagrams to a node in a split netid, MPTN gateways must first determine in which island of the split netid the destination is located.

3. Subnetwork protocols that ensure that all addresses in use in that subnetwork are unique must be extended to all islands of a split netid, since nodes with the same address could exist there due to the use of the same address prefix.

In order to supped split netids, the multicast protocols described in this invention are used. In particular the address prefix common to the nodes in the split netid is treated like a groupid, and this groupid is registered with all MPTN gateways adjacent to all islands of the split netid. Thus, the groupid identifies the group of all islands of the split netid. User datagrams and connection requests will be received that specify a destination address that begins with the split netid prefix (i.e., the groupid), since users will want to communicate with resources in that split netid. MPTN control packets will be addressed to the groupid in order to communicate with one gateway attached to each island of the split netid, as explained below. As with other groups, each group member (i.e,, each island) also requires a unique prefix that will be associated with the groupid in the MURT. This is obtained as follows.

Each gateway attached to a split netid has an address in that subnetwork which is globally unique (this global uniqueness is guaranteed by the subnetwork protocols). If this gateway is the only gateway attached to a particular island of the split netid, it may use its own address in that subnetwork as the unique prefix for the island. Since all routing protocols in the class relevant to this invention (e.g., IDRP, IP, OSPF, OSI IS-IS) require that gateways communicate to exchange routing information, gateways will automatically have contact with all other gateways attached to the same island of the split netid (i.e., all of those gateways with which it exchanges routing information through that subnetwork). Thus, gateways are aware when multiple gateways are attached to the same island of a split netid, and also when gateways are added or removed from the set attached to a split netid island.

The method for selecting a unique prefix to associate with an island of a split netid is as follows:

1. When a gateway is initially activated, it assumes that its own address will be used as the unique prefix for the split netid island to which it is attached.

2. Whenever a gateway becomes aware of the existence of other gateways attached to the same island (which it must in order to implement the existing routing protocols), it examines the addresses of all such gateways and uses the smallest such address (which might be its own) as the unique prefix for the split netid. Since all gateways will execute this algorithm, they will converge to using the same address as the prefix to uniquely identify this island.

This step must be repeated whenever a gateway is added or dropped from the set of gateways attached to the local split netid island.

This method provides valid unique prefixes for split netid islands in the case where two or more disjoint islands are joined into one island, or when a single island is dynamically split into several islands. The algorithm is completely distributed and is guaranteed to result in a correct assignment of unique prefixes to gateways attached to split netid islands.

The unique address prefixes associated with a split netid is called a "derived netid". This is illustrated in FIG. 6.

Figure 6:
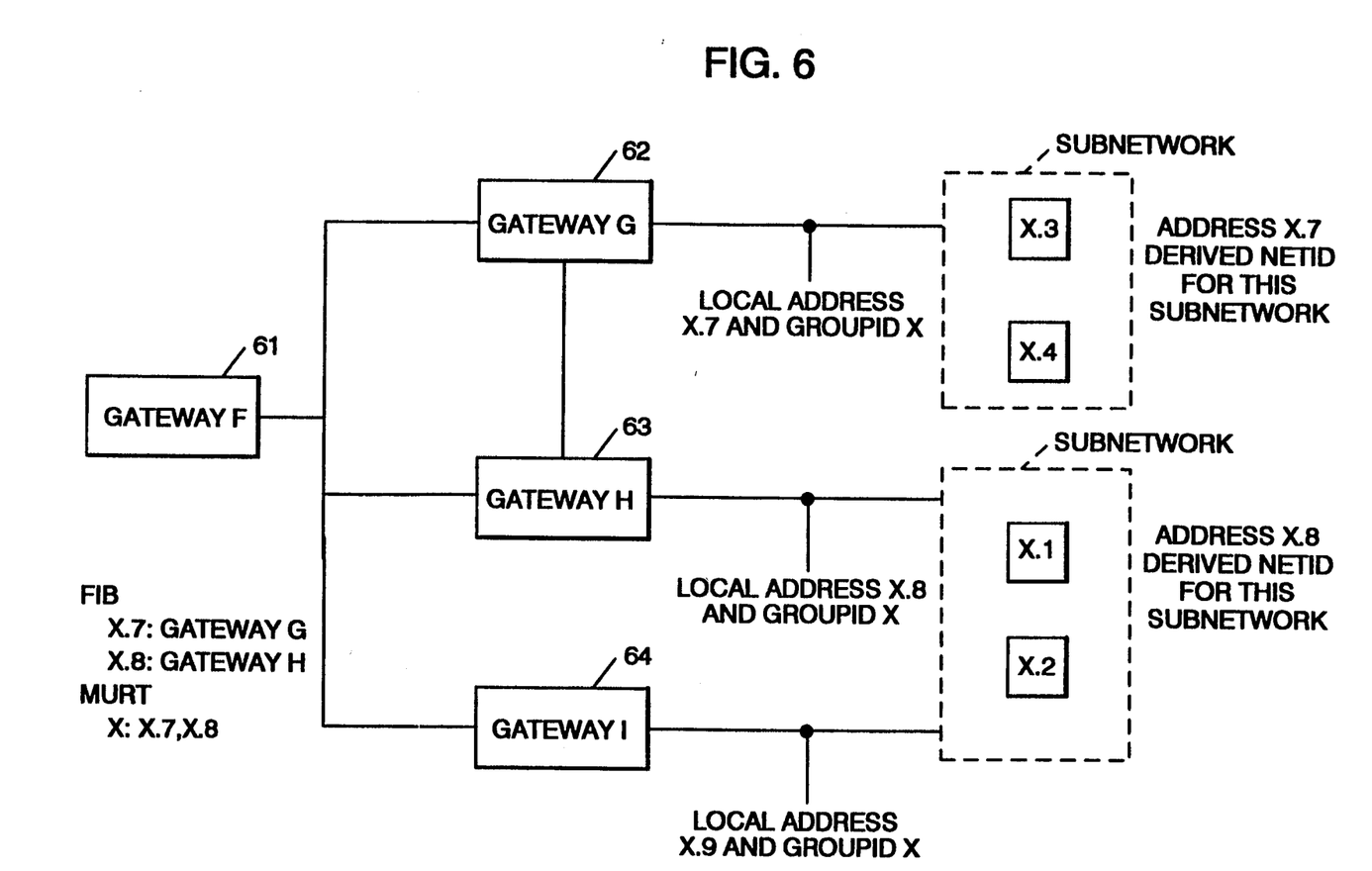
FIG. 6 illustrates the so-called MPTN split net ID support.

In FIG. 6, we see that nodes with address prefix X are located in two different subnetworks. Therefore X, a split netid, is registered as a groupid with the MPTN gateways attached to those subnetworks. Gateway G (62) is the only gateway attached to the top island of split netid X. It therefore uses its local address X.7 as the unique prefix to be associated with groupid X. Gateways H (63) and I (64) are attached to the lower island of the split netid. Since gateway H's address is less that gateway I's (X.8 is less than X.9), they both use X.8 as the unique prefix to be associated with groupid X. Using the protocols of this invention, Gateway F (61) builds the illustrated FIB and MURT table entries associated with the address prefix X.

Using the multicast protocols from the previous sections, and tile procedure for mapping split netids to groupids and derived netids in this section, it is possible to support split netiris in MPTN.

If an MPTN user's packet is to be multicast to all nodes with prefix X, the packet can be distributed to all islands of the split netid using the procedures of the previous sections since X is an entry in the MURT. In the same way, flows which are part of subnetwork name management protocols can be multicast to all pads of a split netid.

If a connection or unicast datagram is to be sent to a node with prefix X (say X.3 in the example in FIG. 6), an additional protocol is required, which forms another part of this invention. An MPTN gateway that is required to route a unicast packet or connection based on an address prefix which appears in the MURT uses this procedure.

1. Using the multicast method described in this invention, a LOCATE request is distributed to one MPTN gateway attached to each island of the split netid. A parameter of the LOCATE is the specific address which is the target of the original unicast packet (i.e., the resource that is to be located). Thus in the example, gateway F (61) multicasts a LOCATE to gateways G (62) and H (63) to determine the location of the resource X.3.

2. Each gateway that receives such a LOCATE request searches the attached subnetwork (using the native protocols of that subnetwork, or MPTN protocols) to determine if the target resource is actually located in that island of the split netid. In the example, gateway G (62) discovers that X.3 is located in the attached subnetwork, while gateway H (63) is not able to locate X.3.

3. All gateways that received the LOCATE return a response to the MPTN gateway that initiated the search that includes the unique prefix of the responder, and a flag which indicates if the resource was found or not. In the example, gateway G (62) returns a response to gateway F (61) that includes its unique address prefix X.7, and a flag that indicates that the resource was found. Gateway H (63) returns a result indicating that the resource was not found.

4. As soon as a positive response to the search is obtained, gateway F (61) is able to route the unicast message or connection to the proper destination. The header of that request must indicate to which gateway the request is being routed (X.7 in the example) so that all gateways can forward the request. The header must further include the address to which the request is destined (X.3) so that the final gateway will be able to route it through the subnetwork containing the destination.

It is important for gateways that cannot locate a particular resource to send a negative response to a LOCATE request. Otherwise, in the case where the target resource does not exist (e.g., a user attempts to send a message to X.5 which does not exist), the gateway that needs to route the request would wait forever for a response. Instead, if a negative response is received from each gateway, it knows that the resource in question is unreachable and it can therefore reject the original request.

This terminates the description of the preferred embodiments. Of course, numerous variations of the given examples are possible, still within the scope of the invention as claimed.

We claim:

1. A method for multicasting a message from a sending station to a plurality of receiving stations within a conventional unicast message transmission network using existing protocols, said network containing a plurality of subnetworks and a plurality of gateway nodes connecting, and acting as entry ports to, said subnetworks, said method comprising:
    distributing multicast group information by each subnetwork to each connected gateway node, said group information identifying each group of receiving stations reachable in said subnetwork;
    building and maintaining a multicast routing table in each gateway node, said routing table containing said group information to enable the routing of multicast messages to each said group of receiving stations, said multicast routing table having a single entry for each said group;
    transmitting said multicast message with a group identifier carried in a header part of said multicast message defining an addressed group of receiving stations; and
    in each gateway node, reading and interpreting said group identifier transmitted in said multicast message to direct forwarding of said multicast message to said addressed group of receiving stations.

2. The method of claim 1, wherein the group information in the multicast routing table at each gateway node contains at least one prefix corresponding to each group identifier identifying each subnetwork in which the addressed group of receiving station(s) is located, and wherein said header part of each said multicast message contains said corresponding prefix.

3. The method of claim 2, wherein the receiving stations defined by the group identifier are located in different subnetworks.

4. The method of claim 1, wherein the multicast routing table maintained in a particular gateway node includes information of only those receiving stations that can be reached via said gateway node.

5. The method of claim 2, wherein the multicast routing table (MURT) maintained in a particular gateway node includes information of those receiving stations that can be reached via said gateway node.

6. The method of claim 3, wherein the multicast routing table maintained in a particular gateway node includes information of those receiving stations that can be reached via said gateway node.

7. The method of claim 1, wherein only those gateway nodes which are connected to possible sources of multicast messages maintain a multicast routing table of the addressable receiving stations.

8. The method of claim 2, wherein only those gateway nodes which are connected to possible sources of multicast messages maintain a multicast routing table of the addressable receiving stations.

9. The method of claim 3, wherein only those gateway nodes which are connected to possible sources of multicast messages maintain a multicast routing table of the addressable receiving stations.

10. The method of claim 4, wherein only those gateway nodes which are connected to possible sources of multicast messages maintain a multicast routing table of the addressable receiving stations.

11. The method of claim 5, wherein only those gateway nodes which are connected to possible sources of multicast messages maintain a multicast routing table of the addressable receiving stations.

12. The method of claim 6, wherein only those gateway nodes which are connected to possible sources of multicast messages maintain a multicast routing table of the addressable receiving stations.

13. The method of any one of claims 2, 3, 5, 6, 8, 9, 11, or 12, wherein the group identifier and the corresponding prefixes are transmitted to the gateway nodes together with conventional routing information.

14. A system for multicasting a message from a sending station to a plurality of receiving stations within a conventional unicast message transmission network using existing protocols, said network consisting of a plurality of subnetworks connected by a plurality of gateway nodes, said system comprising:
    means at each of said plurality of gateway nodes for routing multicast messages to a group of receiving stations, said routing means including a routing table having a single entry for each addressable group of receiving stations,
    wherein each multicast message to be transmitted carries a header that contains information defining the addressable group of receiving stations to receive said each multicast message, and,
    means in each gateway node for interpreting, comparing and modifying the header of said each multicast message.

15. The system of claim 14, wherein said plurality of subnetworks are of different types and use different message transmission protocols.

16. The system of claim 15, wherein only a subset of said plurality of subnetworks is equipped to support multicasting.

* * * * *